US005878265A

United States Patent [19]
Hartmann

[11] Patent Number: 5,878,265
[45] Date of Patent: Mar. 2, 1999

[54] DATA TRANSFER NETWORK ON A CHIP UTILIZING POLYGONAL HUB TOPOLOGY

[75] Inventor: Alfred C. Hartmann, Round Rock, Tex.

[73] Assignee: Advanced Micro Devices, Inc., Sunnyvale, Calif.

[21] Appl. No.: 891,817

[22] Filed: Jul. 14, 1997

[51] Int. Cl.$^6$ ..................................................... G06F 15/80
[52] U.S. Cl. ................................. 395/800.11; 395/800.01
[58] Field of Search ........................ 395/800.11, 800.12, 395/800.01

[56] References Cited

U.S. PATENT DOCUMENTS

| | | | |
|---|---|---|---|
| 4,797,882 | 1/1989 | Maxemchuk | 370/94 |
| 4,933,933 | 6/1990 | Dally et al. | 370/60 |

OTHER PUBLICATIONS

Itano, et al "HIRB: A Hierarchical Ring Bus" University of Tsukuba, Japan, Proceedings of the Nineteenth Annual Hawaii International Conference on System Sciences, 1986, pp. 206–213.

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechanism for Dynamic Reordering of Memory References," IEEE Transactions on Computers, vol. 45, No. 5, May 1996, pp. 552–571.

Barroso, et al, "Performance Evaluation of the Slotted Ring Multiprocessor," IEEE Transactions on Computers, vol. 44, No. 7, Jul. 1995, pp. 878–890.

Bhuyan, et al, "Approximate Analysis of Single and Multiple Ring Networks," IEEE Transactions on Computers, vol. 38, No. 7, Jul. 1989, pp. 1027–1040.

Arden, et al, "Analysis of Chordal Ring Network," IEEE Transactions on Computers, Vo. C–30, No. 4, Apr. 1981, pp. 291–301.

*Primary Examiner*—Eric Coleman
*Assistant Examiner*—Kenneth Duff, Jr.
*Attorney, Agent, or Firm*—Conley, Rose & Tayon; Jeffrey C. Hood; Louis H. Iselin

[57] ABSTRACT

A computer chip includes a plurality of modules interconnected in an on-chip data transfer network configured in a mesh of rings, ring or rings, or polygonal hub topology. The data transfer network includes links or buses and a switchpoint. The links or buses are configured in a ring topology as a ring of rings or polygonal hub with each group of links or bus including a portion which is shared with a portion of another group of links bus. The bus switchpoint is positioned as a hub at the intersection of the ring of rings. The switchpoint is operable to route data from a source to a destination so that the modules are operable to communicate with each other through the links or buses, and the switchpoint. In various embodiments, the modules are coupled to the links or buses and/or the switchpoint. The various modules may be processors, memories or hybrids and may include, or be coupled through, a communication port coupled to one of the links or buses such that the communication port is operable to transmit and receive data on one or more of the groups of links or buses.

13 Claims, 7 Drawing Sheets

5,878,265

DATA TRANSFER NETWORK ON A CHIP UTILIZING POLYGONAL HUB TOPOLOGY

BACKGROUND OF THE INVENTION

1. Field of the Invention

The present invention is related to semiconductor computer chips, and more particularly to a system for connecting modules in an on-chip data transfer network utilizing a mesh of rings (polygonal hub) topology.

2. Description of the Related Art

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system is desired for information transfer between a plurality of different functions or modules on a single computer chip.

SUMMARY OF THE INVENTION

The present invention comprises a computer chip with a plurality of modules interconnected in an on-chip data transfer network configured in a mesh of rings, ring of rings, or polygonal hub topology. The data transfer network comprises a plurality of links or buses, and a switchpoint. The plurality of links or buses are each configured in a ring topology, and the plurality of links or buses are collectively configured as a ring of rings, with each group of links or bus including a portion which is shared with a portion of another group of links or bus. The switchpoint is positioned as a hub at the intersection of the ring of rings. The switchpoint is operable to route data from a source link or bus to a destination link or bus so that the modules are operable to communicate with each other through the groups of links or buses, and the switchpoint.

In various embodiments, the modules are coupled to the links or buses and/or the switchpoint. The various modules may be processors, memories and/or hybrids and may include, or be coupled through, a communication port coupled to one of the links or buses. The communication port is operable to transmit and receive data on one or more of the links or buses. In one embodiment, the links comprise transfer paths directly connected between various inputs and output of the switchpoint to form collectively a ring of rings with one or more of the transfer paths comprised in two different neighboring rings.

BRIEF DESCRIPTION OF THE DRAWINGS

A better understanding of the present invention can be obtained when the following detailed description of the preferred embodiment is considered in conjunction with the following drawings, in which.

Figure 1:
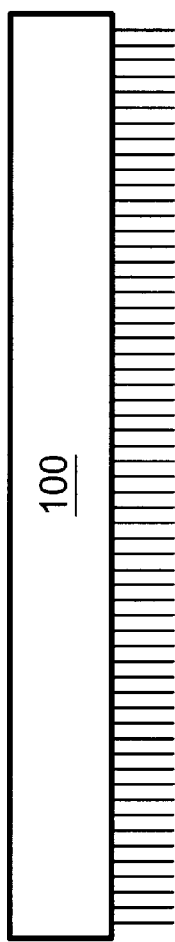
FIG. 1 illustrates a computer chip comprising an on-chip data transfer network according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises a computer chip including a data transfer network utilizing a mesh of rings or polygonal hub topology. A uniform numbering scheme is adopted for this disclosure; descriptions of one embodiment and/or figure may be used to further understand the workings and usage of other embodiments and/or figures as necessary.

FIG. 1—Computer Chip

Referring now to FIG. 1, a computer chip 100 is shown from a side view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 utilizes a mesh of rings or polygonal hub topology to interconnect multiple module types on a single computer chip 100, preferably using intelligent buffering and a universal port design. Connecting each module to a communications pathway with a full duplex, general purpose communications port allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIGS. 2A–5.

Figure 2A:
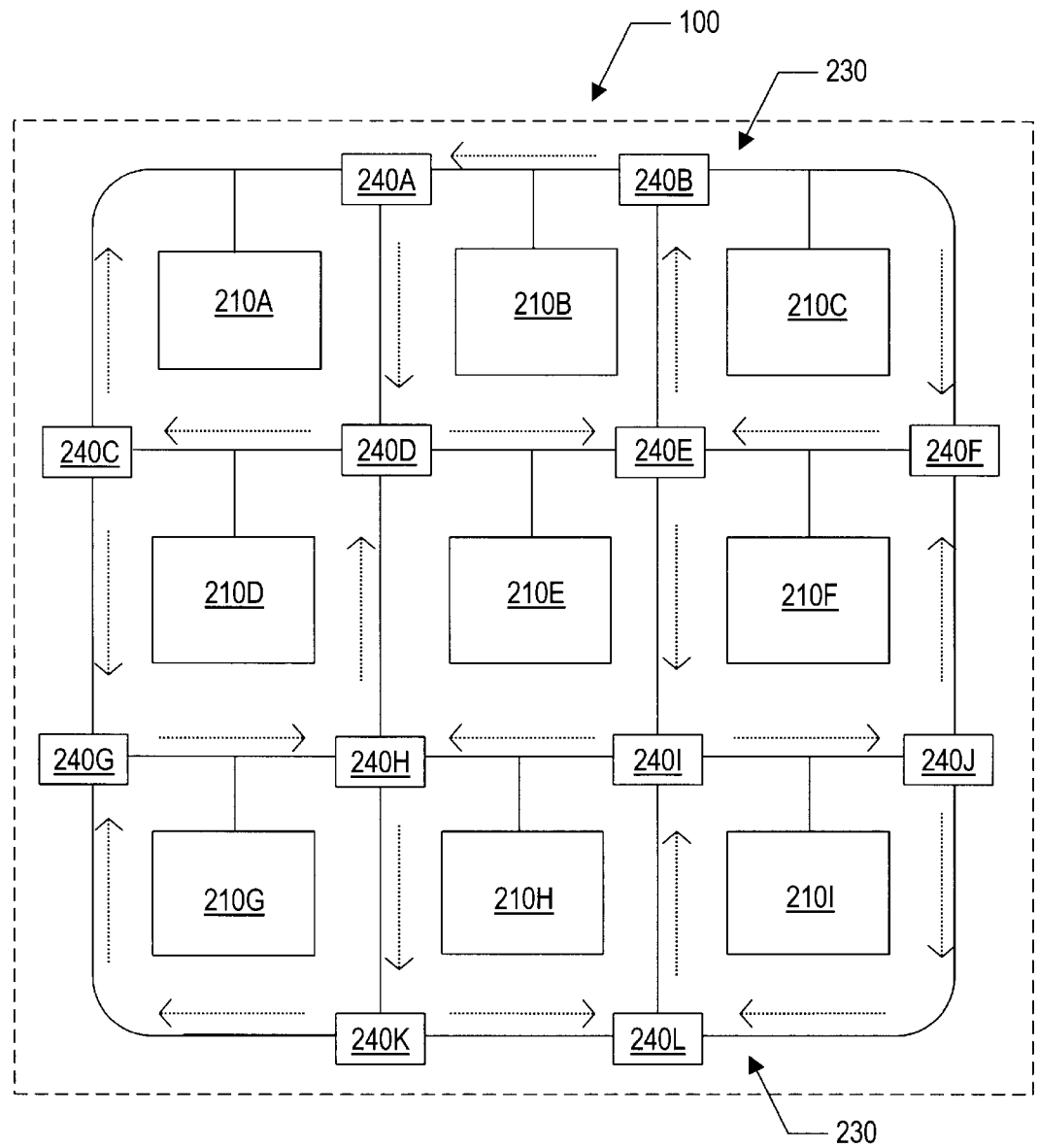
FIG. 2A illustrates an embodiment of the data transfer network shown in FIG. 1 according to the present invention.

FIG. 2A—On-Chip Network with Distributed Switching

Referring now to FIG. 2A, an embodiment is shown of computer chip 100 with a data transfer network utilizing a mesh of rings topology for interconnecting a plurality of modules 210A–210I on a single computer chip 100 in an on-chip network. When a reference is made to module 210, that reference may refer to any of the modules 210A–210I. The components of the network preferably include a plurality of buses 230 which provide an electrical path for data communications between the plurality of modules 210 comprised on the computer chip 100. When a reference is made to bus 230, that reference may refer to any part associated with bus 230, including those labeled with an associated letter designation, such as 230A. For example, bus 230H may preferably refer to the four sections or transfer paths of bus 230 which enclose module 210H, linking switchpoints 240H, 240K, 240L and 240I. Bus 230 may also be links 230 as desired, providing point-to-point communications.

The modules 210 preferably perform operations, and modules may be devices such as a processor, an I/O controller, or storage (memory), or a hybrid of tasks, like a task-specific hybrid (ASIC) or a task-general hybrid. A plurality of switchpoints 240A–240L, also referred to as bus switchpoints 240, are comprised on computer chip 100 interconnecting the buses 230.

In the embodiment of FIG. 2A, the system includes, moving from top to bottom, left to right, modules 210A to 210I, in three rows of three modules, each surrounded by buses 230A through 230I. The plurality of buses 230 are collectively configured in a mesh of rings such that a portion of each bus 230 is also a portion of one or more adjacent buses 230. Each bus 230 includes at least three transfer paths, and a subset of buses 230 include four transfer paths. For example, bus 230A (circulating clockwise) comprises three sections or transfer paths of bus 230 interconnecting switchpoints 240A, 240D, and 240C. Bus 230B (circulating counterclockwise) comprises four sections or transfer paths of bus 230 interconnecting switchpoints 240A, 240D, 240E and 240B. Thus buses 230A and 230B both include a section or transfer path of bus 230 between switchpoints 240A and 240D where the adjacent counter-circulating flows merge in a common direction on the shared link. Modules 210A–210I are shown coupled to their respective bus 230 on the topmost segment of the bus 230. Other locations for the module 210 coupling are possible, such as to another segment of bus 230 or to one or more switchpoints operable to route data to the module 210. In the embodiment of FIG. 2A, the twelve switchpoints 240 are arranged in a two-four-four-two geometry with corner switchpoints 240 not included at the "corners" of the chip 100. One way to define a corner switchpoint is a switchpoint that is a part of only one bus 230, e.g., a corner switchpoint is never shared between two or more buses 230. In an alternative embodiment, corner switchpoints may be included for off-chip communications to extend the mesh of rings over multiple chips. The dotted arrows in FIG. 2A refer to the preferred direction of data movement on bus 230. In general, the preferred direction is clockwise in the upper left-most ring and then alternating counter-clockwise and clockwise for adjacent rings, as shown.

The data transfer network of computer chip 100 preferably includes a plurality of buses 230 comprised on the computer chip 100. Each of the plurality of buses 230 is configured in a ring topology with the plurality of buses 230 configured as a mesh of rings. Each of the plurality of buses 230 includes a portion which is shared with a portion of another of the buses 230. A plurality of bus switchpoints 240 comprised on the computer chip 100 are positioned at intersections of the mesh of rings comprised of the plurality of buses 230. Each of the bus switchpoints 240 is operable to route data from a source bus 230 to a destination bus 230, which may be the same bus 230. A plurality of modules 210 coupled to at least one of the plurality of buses 230 are operable to communicate with each other through the buses 230 via the switchpoints 240. Additional details concerning the modules 210 are given below in reference to FIG. 4.

In one embodiment, each of the plurality of buses 230 is operable to transfer data in only one direction. The preferred direction is the direction shown in FIG. 2A by the dotted arrows. A subset of the plurality of bus switchpoints 240 may be coupled to receive data from first or second transfer paths and provide said data to first, second, third or fourth transfer paths. The preferred direction for data transfer from a module 210 and a bus 230 is to and from the module 210 and the bus 230. In another embodiment, each bus 230 is operable to transfer data in any direction available.

The plurality of bus switchpoints 240 includes a first plurality of external bus switchpoints 240, such as switchpoints 240A, 240B, 240C, 240F, 240G, 240J, 240K and 240L, and a second one or more internal bus switchpoints, such as switchpoints 240D, 240E, 240H and 240I. In addition, the corner switchpoints referred to above would be external bus switchpoints. The simplest mesh of rings structure data transfer network with both external and internal switchpoints 240 would be a two by two structure with four external switchpoints 240 and one internal switchpoint 240.

Figure 2B:
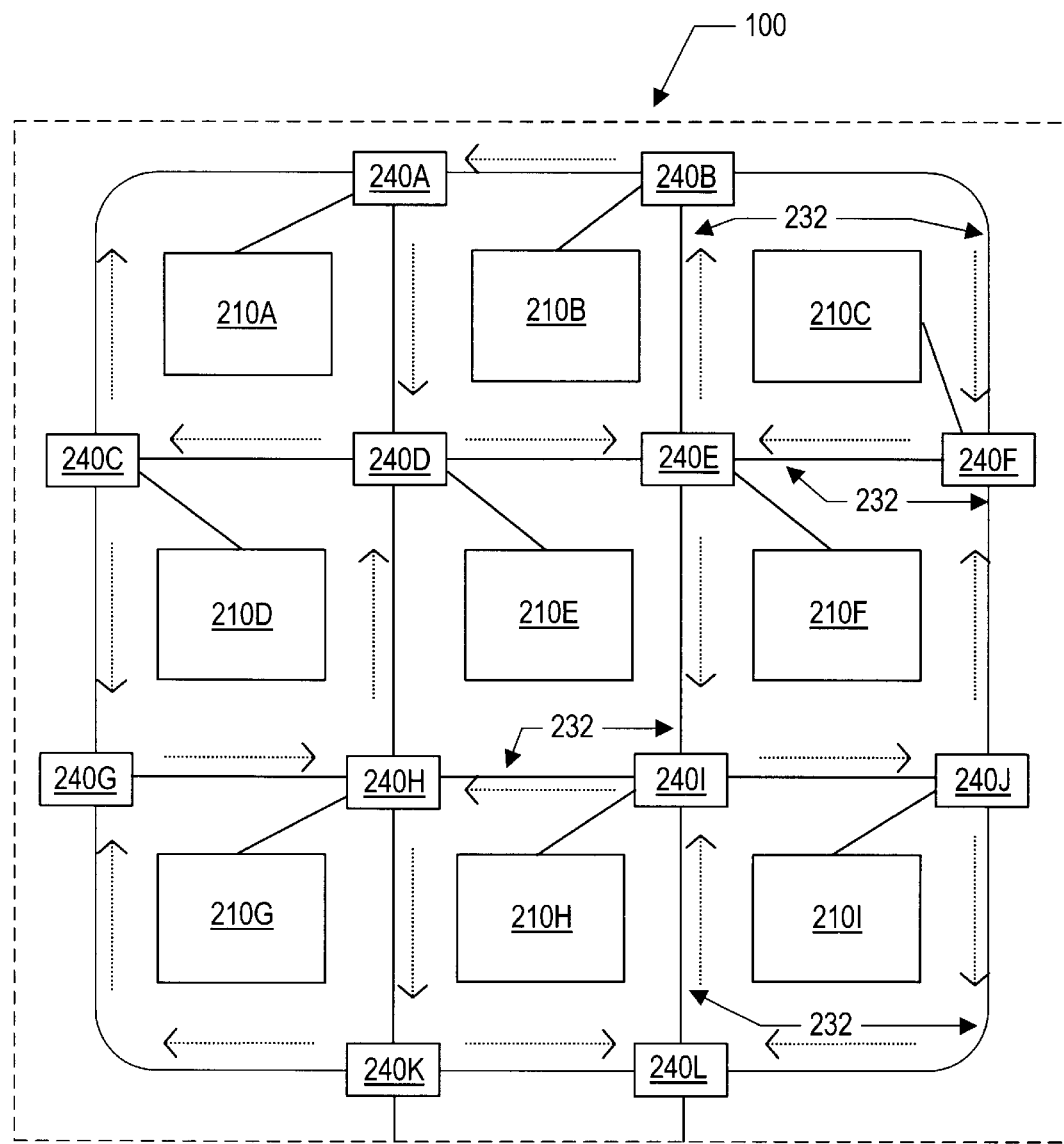
FIG. 2B illustrates another embodiment of the data transfer network shown in FIG. 2A according to the present invention.

FIG. 2B—On-Chip Network with Distributed Switching

Referring now to FIG. 2B, another embodiment is shown of computer chip 100 with an on-chip data transfer network utilizing a mesh of rings topology for interconnecting a plurality of modules 210A–210I on a single computer chip 100. A primary difference between FIG. 2A and FIG. 2B is the coupling of the modules 210 to the switchpoints 240 instead of the transfer paths 232 in FIG. 2B. Some details of FIG. 2B are described in detail in reference to FIG. 2A using the uniform numbering scheme. The components of the network preferably include a plurality of transfer paths 232 which provide an electrical path for data communications between the plurality of modules 210 comprised on the computer chip 100. The number 230 is used for the buses of FIG. 2A, the number 330 for the buses of FIGS. 3A and 3B, and the number 232 is used for the transfer paths of FIG. 2B. A bus 230 forms a ring structure by itself as it passes through one or more switchpoints 240, while a transfer path 232 is a link from one switchpoint 240 to another switchpoint 240, which in combination with other transfer paths 232 may be described as forming a ring structure.

In this embodiment, the data transfer network comprises a plurality of switchpoints 240 and a plurality of transfer paths 232 directly connected between each two of the switchpoints 240. The plurality of transfer paths 232 and the plurality of switchpoints 240 collectively form a mesh of rings, wherein one or more of the plurality of transfer paths 232 are comprised in two different neighboring rings. The switchpoints are positioned at intersections of the mesh of rings comprised of the plurality of transfer paths 232. Each of the switchpoints 240 is coupled to at least three transfer paths 232, and each of the bus switchpoints 240 is operable to route data from a source transfer path 232 to a destination transfer path 232. The source transfer path 232 and the destination transfer path 232 may be the same transfer path 232. The plurality of modules 210 are preferably coupled to at least one of the switchpoints 240. Alternatively, the plurality of modules may be coupled to at least one of the plurality of transfer paths 232. In any case, the plurality of modules 210 are operable to communicate with each other through the transfer paths 232 and the switchpoints 240.

The plurality of transfer paths 232 includes a first plurality of external transfer paths 232 and one or more internal transfer paths 232. The first plurality of external transfer paths 232 are comprised in only one ring, such as the transfer path 232 between switchpoints 240J and 240L. The one or more internal transfer paths 232 are comprised in two different rings, such as the transfer path 232 between 240L and 240I. Depending on the geometry of the mesh of rings structure, a subset of the plurality of switchpoints 240 may be coupled to four or more of the data transfer paths 232. For example, internal switchpoints 240D, 240E, 240H and 240I are each coupled to four data transfer paths 232. Additional transfer paths are shown coupled to switchpoints 240K and 240L to allow for coupling computer chip 100 to another computer chip for inter-chip data transfer as desired. If utilized, external switchpoints 240K and 240L would become internal switchpoints 240 on the resulting expanded multi-chip data network.

Figure 3A:
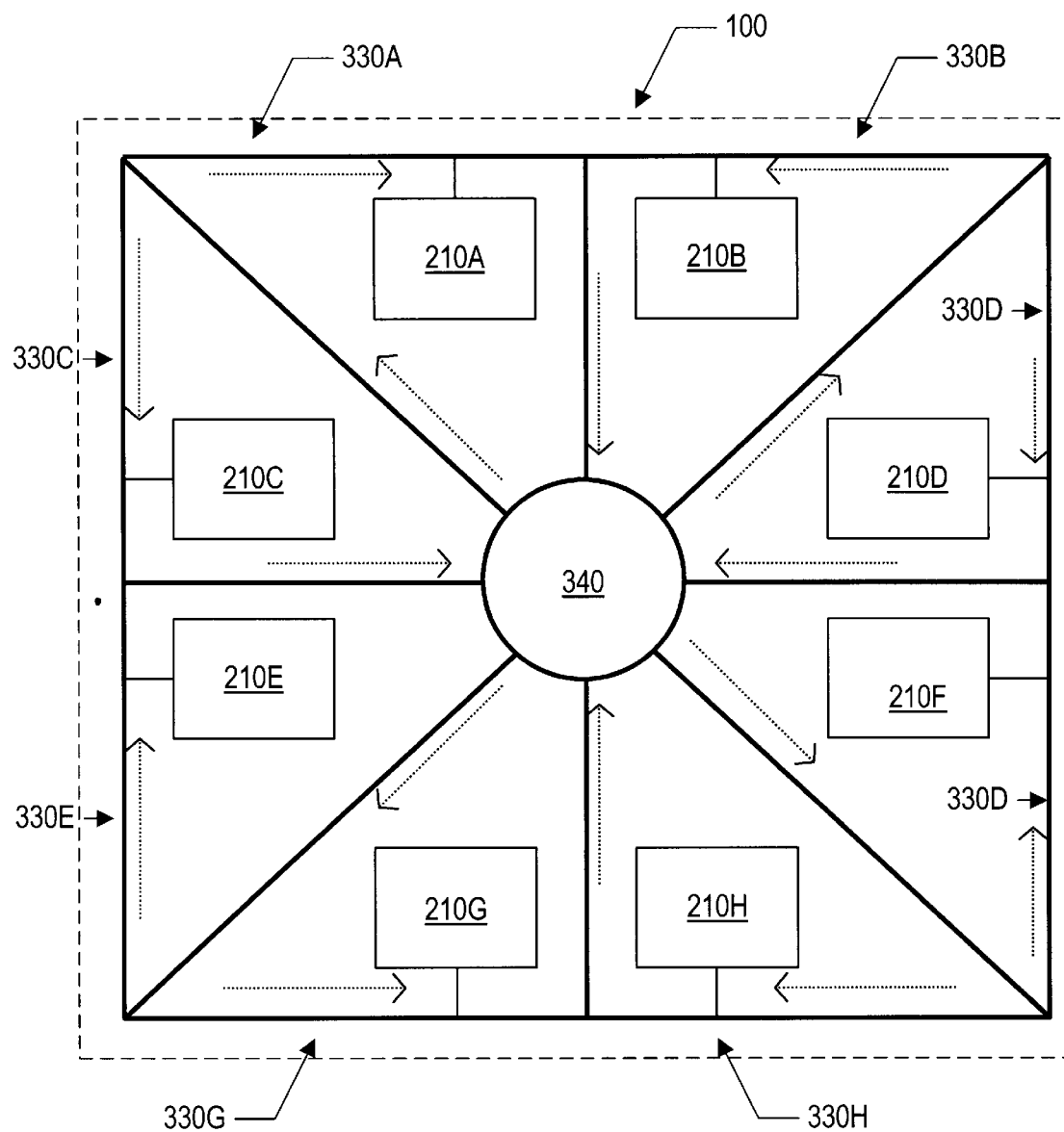
FIG. 3A illustrates another embodiment of the data transfer network shown in FIG. 1 according to the present invention.

FIG. 3A—On-Chip Network with Centralized Switching

Referring now to FIG. 3A, another embodiment is shown of computer chip 100 with a data transfer network utilizing a mesh of rings, ring of rings or polygonal hub topology for interconnecting a plurality of modules 210A–210H on the single computer chip 100. The components of the network preferably include a plurality of buses 330 which provide an electrical path for data communications between the plurality of modules 210 comprised on the computer chip 100.

This embodiment of computer chip 100 includes a plurality of buses 330 configured in a multiple ring topology. The plurality of buses 330 are configured as a ring of rings where each of the plurality of buses 330 includes a portion which is shared with a portion of another bus 330. All buses have a common intersection at a switchpoint 340 operable as a hub to route data from one or more source buses 330 to one or more destination buses 330. FIG. 3A illustrates a central switchpoint 340 surrounded by modules 210A–210H in a circular fashion. Switchpoint 340 is similar to the switchpoints 240 shown in FIGS. 2A and 2B. Each module 210A–210H is coupled to a respective bus 330A–330H on an unshared portion of the respective bus 330. The location on the bus 330 for the coupling is moveable as will be shown in FIG. 3B below. Other locations for coupling module 210 are contemplated, such as to the switchpoint 340. The modules 210 are operable to communicate with each other through the buses 330 and/or the switchpoint 340.

The dotted arrows illustrate the preferred unidirectional flow of data on the buses 330. Other directions and bi-directional flow are also contemplated. In the preferred embodiment, the data transfer network comprises only one switchpoint 340 positioned at the common intersection of the mesh of rings comprising said plurality of buses 330. This solo switchpoint 340 is operable to route data between each of the plurality of buses 330. Additional details relating to FIG. 3A are described in reference to other figures according to the uniform numbering scheme.

Figure 3B:
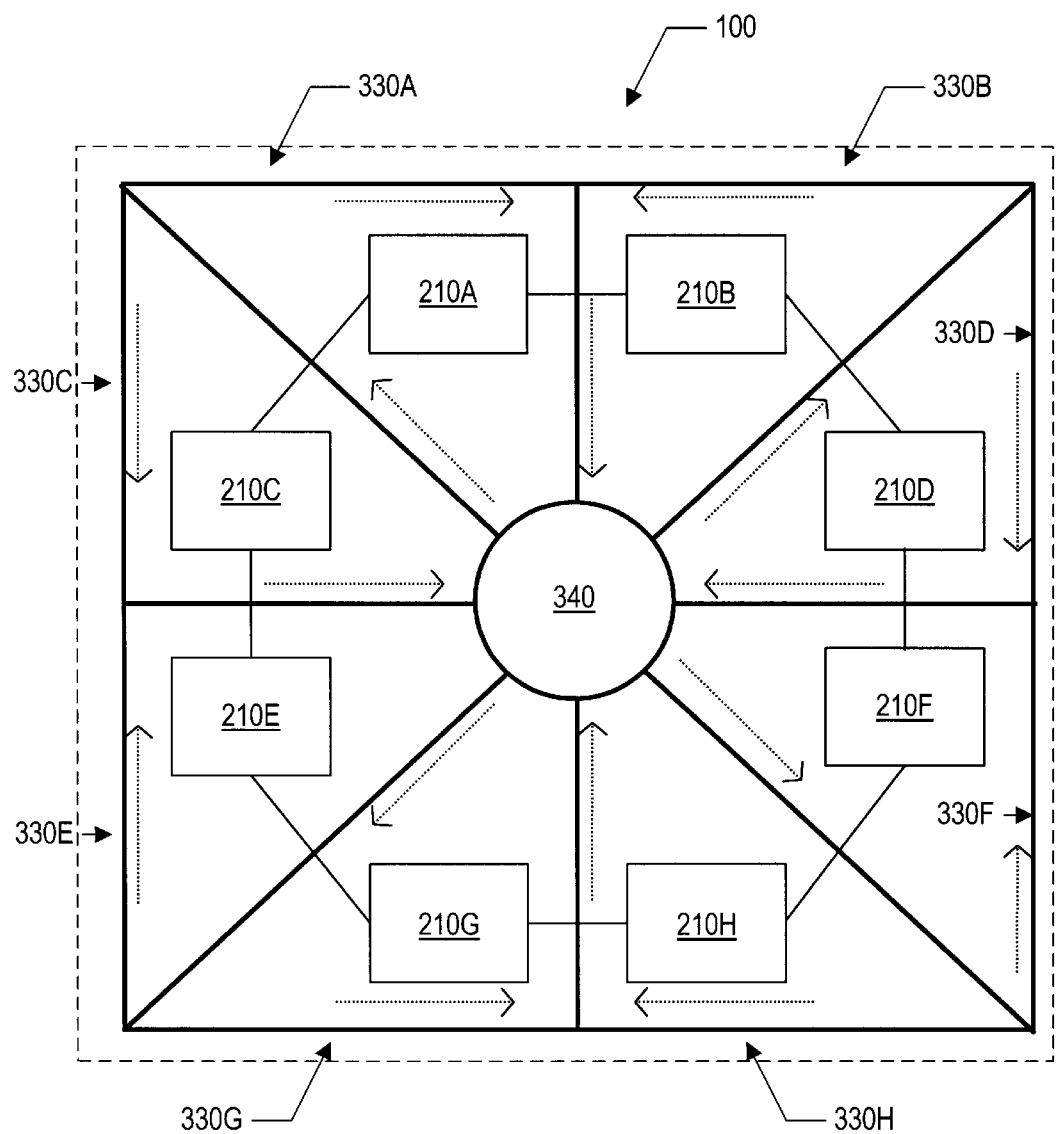
FIG. 3B illustrates another embodiment of the data transfer network shown in FIG. 3A according to the present invention.

FIG. 3B—On-Chip Network with Centralized Switching

Referring now to FIG. 3B, another embodiment is shown of computer chip 100 with an data transfer network utilizing a mesh of rings or polygonal hub topology for interconnecting a plurality of modules 210A–210H on a single computer chip 100 in an on-chip network. The components of the network preferably include a plurality of buses 330 which provide an electrical path for data communications between the plurality of modules 210 comprised on the computer chip 100.

Although similar in many respects to FIG. 3A, this embodiment illustrates each module 210A–210H coupled to a respective bus 330A–330H on a shared portion of the respective bus 330. The location on the bus 330 for the coupling allows for adjacent modules to transfer data without using the bus 330 or the switchpoint 340. The modules 210 are also preferably operable to communicate with each other through the buses 330 and/or the switchpoint 340. Additional details relating to FIG. 3B are described in reference to other figures according to the uniform numbering scheme. It is noted that the buses 330 may also be described using the transfer link terminology used with respect to FIG. 2B.

FIG. 4—Module

Figure 4:
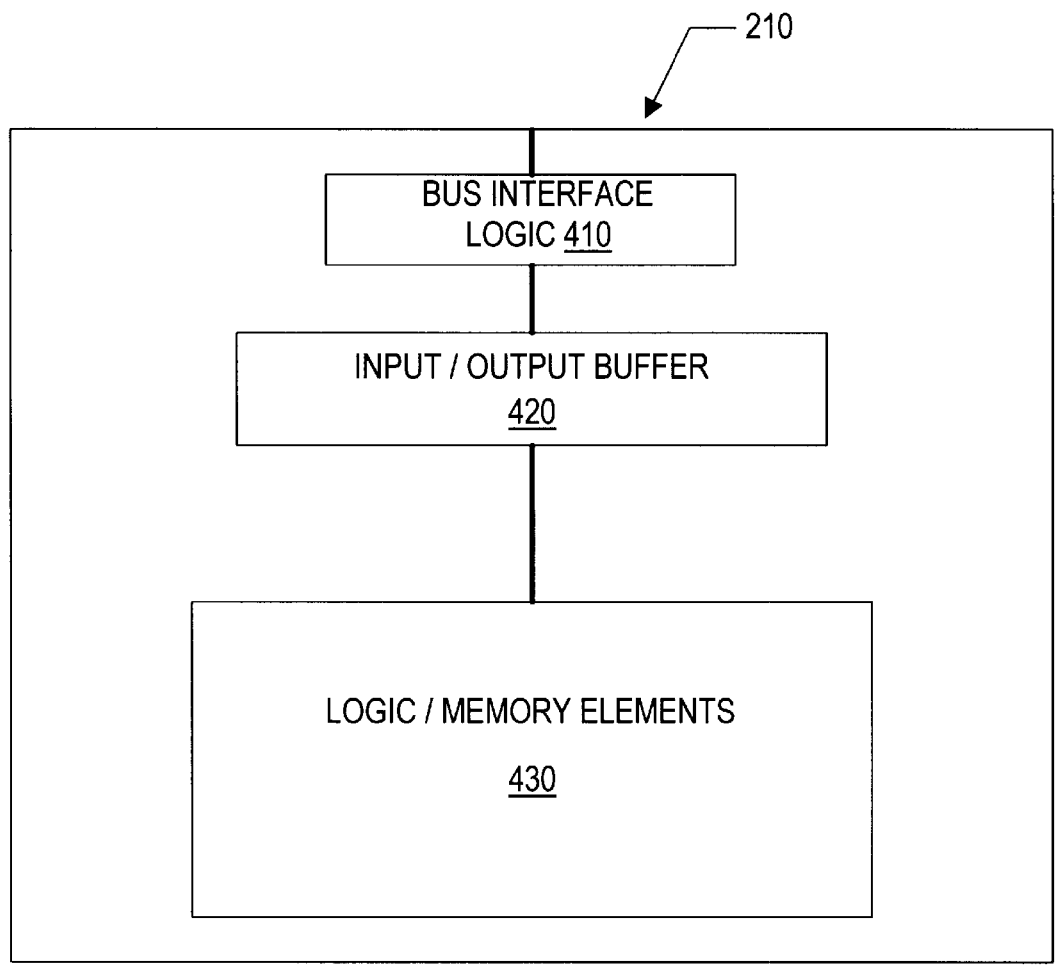
FIG. 4 illustrates an embodiment of a module according to the present invention.

Referring now to FIG. 4, a module 210 is shown. Each module 210 is preferably one of the group which includes processors, memories or hybrids. A processors may be a CPU, FPU, or an I/O controller in any of the variety of possible forms. A memory may be a RAM, ROM, hybrid memory or active memory in any of the variety of possible forms. Hybrids may be task-specific, like an ASIC, or task-general.

Each module may couple to a bus 230, a bus 330, a transfer link 232, or a switchpoint 240, and/or another module 210 or other device as desired using bus interface logic 410 either incorporated in the module 210 or as part of a communication port (not shown) physically imposed between the module 210 and the bus 230, etc. A communication port is operable to transmit and receive data on the transfer paths 232 or buses 230 or 330 either when comprised in the module 210 or independent.

Module 210 transmits and receives data from other modules 210 via an input/output buffer 420 coupled to the bus interface logic 410 and the logic/memory elements 430 of the module 210. Other components with or without other couplings may also comprise the module 210 as desired.

FIG. 5—Switchpoint

Figure 5:
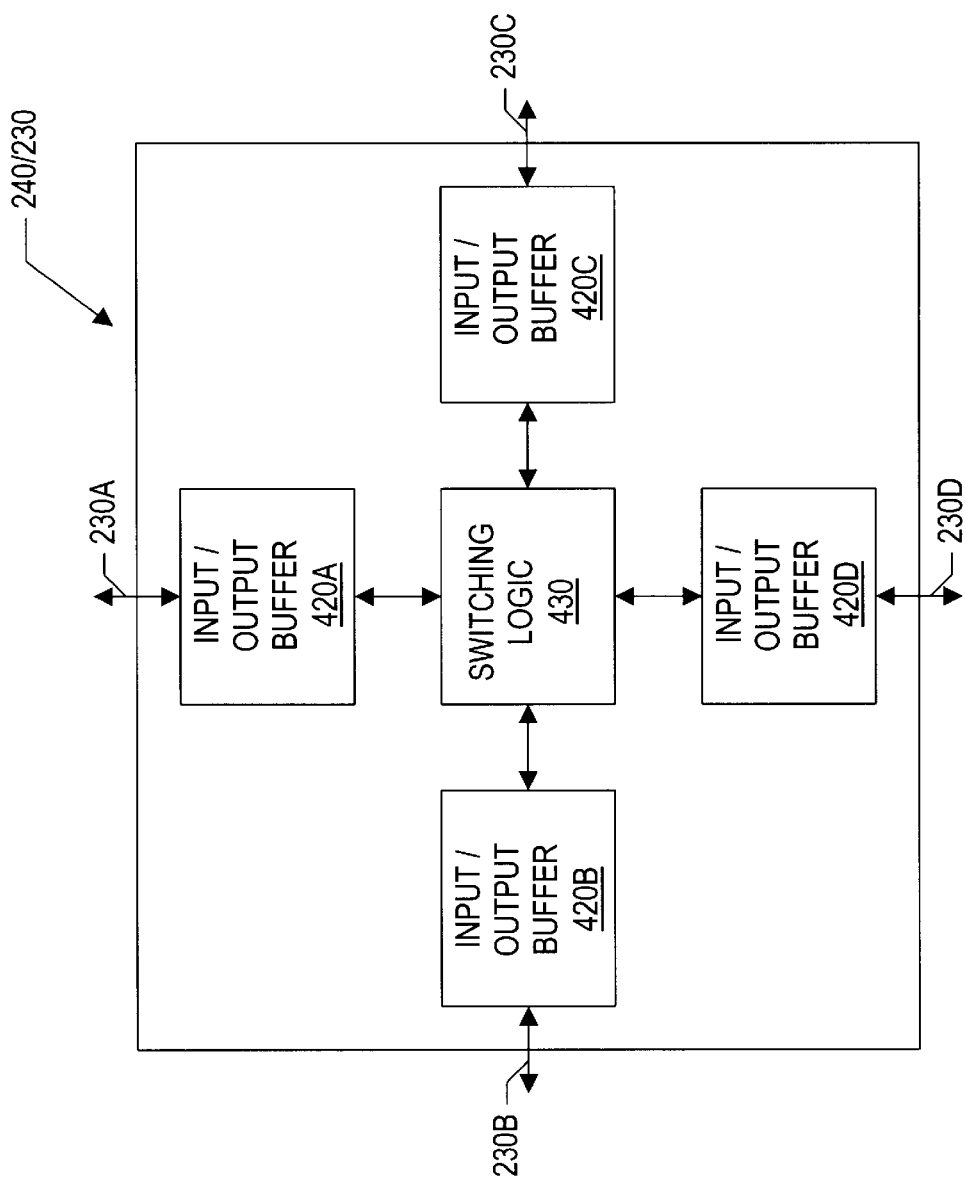
FIG. 5 illustrates an embodiment of a switchpoint according to the present invention.

Referring now to FIG. 5, a switchpoint 240 is shown; for illustrative purposes, the illustrated switchpoint 240 it is a four by four switchpoint 240 with four inputs and four outputs. Other numbers of inputs and outputs are contemplated, including switchpoints 240 with physically separate inputs and outputs. All descriptions of switchpoints 240 may also be applied to switchpoint 340 operating as a central hub in a ring topology as a mesh of rings comprised of buses 330. In the preferred embodiment, switchpoint 340 would include more input/output connections than the four by four shown. As shown, the switchpoint 240 comprises four couplings to bus 230 labeled 230A through 230D. The switchpoint 240 couples to the bus 230 through input/output buffers 420A–420D, respectively. Each input/output buffer 420 couples to switching logic 430 which controls the routing of all data that passes through the switchpoint 240.

The data transfer network preferably includes a plurality of bus switchpoints 240 comprised on the computer chip 100 and positioned at intersections of the mesh of rings made up of the plurality of buses 230. Each switchpoint 240 is operable to route data from a source bus 230 to a destination bus 230. Any number of buses 230 may be coupled to any given switchpoint 240. Preferably, at least a subset of the plurality of bus switchpoints 240 is coupled to receive data from first or second buses 230 and provide the received data to first, second, third or fourth buses 230. The plurality of switchpoints 240 may be divided in many cases into a first plurality of external bus switchpoints 230 and a second one or more internal bus switchpoints 230. External bus switchpoints 230 are usually coupled to more buses 230 than internal bus switchpoints 230. Additional details relating to FIG. 5 are described in reference to other figures according to the uniform numbering scheme.

Conclusion

Therefore, the present invention comprises an improved system for connecting modules on a computer chip in an on-chip data transfer network. Although the system of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer chip comprising a data transfer network, the data transfer network comprising:
   a plurality of buses comprised on the computer chip, wherein each of said plurality of buses are configured in a ring topology, wherein said plurality of buses are configured as a mesh of rings, wherein each of said plurality of buses includes a portion which is shared with a portion of another of said buses, wherein each of said plurality of buses have a common intersection;
   a switchpoint comprised on the computer chip and positioned at the common intersection of said mesh of rings comprising said plurality of buses, wherein said switchpoint is operable to route data from one or more source buses to one or more destination buses;
   a plurality of modules, wherein each of said plurality of modules is coupled to at least one of said plurality of buses, wherein said plurality of modules are operable to communicate with each other through said buses.

2. The computer chip of claim 1, wherein each of said plurality of buses are operable to transfer data in only one direction.

3. The computer chip of claim 1, wherein said computer system includes only one switchpoint, wherein said only one switchpoint is positioned at the common intersection of said mesh of rings comprising said plurality of buses; wherein said switchpoint is operable to route data between each of said pluralitiy of buses.

4. The computer chip of claim 1, wherein each of said plurality of modules is operably coupled to communicate with a neighboring module without requiring uses of any of said plurality of buses.

5. The computer chip of claim 1, wherein each of said modules comprises a communication port coupled to one of said buses, wherein the communication port is operable to transmit and receive data on said one of said buses.

6. The computer chip of claim 1, wherein each of said plurality of buses are operable to transfer data in two directions.

7. The system of claim 1, wherein each of said plurality of modules is selected from said group including a processor, a memory, an I/O controller, a task-specific hybrid, and a task-general hybrid.

8. A computer chip comprising a data transfer network, the data transfer network comprising:
   a plurality of buses comprised on the computer chip, wherein each of said plurality of buses are configured in a ring topology, wherein said plurality of buses are configured as a mesh of rings, wherein each of said plurality of buses includes a portion which is shared with a portion of another of said buses, wherein each of said plurality of buses have a common intersection;
   a single switchpoint comprised on the computer chip and positioned at the common intersection of said mesh of rings comprising said plurality of buses, wherein said switchpoint is operable to route data between each of said pluralitiy of buses;
   a plurality of modules, wherein each of said plurality of modules is coupled to at least one of said plurality of buses, wherein said plurality of modules are operable to communicate with each other through said buses.

9. The computer chip of claim 8, wherein each of said plurality of buses are operable to transfer data in only one direction.

10. The computer chip of claim 8, wherein each of said plurality of buses are operable to transfer data in two directions.

11. The computer chip of claim 8, wherein each of said plurality of modules is operably coupled to communicate with a neighboring module without requiring uses of any of said plurality of buses.

12. The computer chip of claim 8, wherein each of said modules comprises a communication port coupled to one of said buses, wherein the communication port is operable to transmit and receive data on said one of said buses.

13. The system of claim 8, wherein each of said plurality of modules is selected from said group including a processor, a memory, an I/O controller, a task-specific hybrid, and a task-general hybrid.

* * * * *